United States Patent [19]

Uehara et al.

[11] Patent Number: 5,085,822
[45] Date of Patent: Feb. 4, 1992

[54] METHOD FOR STRETCH BLOW MOLDING AND UNIFORMLY COOLING A HOLLOW HEAT-RESISTANT

[75] Inventors: Shinichi Uehara; Kouichi Satou; Seigo Baba, all of Ueda, Japan

[73] Assignee: Nissei ASB Machine Co., Ltd., Japan

[21] Appl. No.: 572,407

[22] Filed: Aug. 27, 1990

[30] Foreign Application Priority Data

Aug. 31, 1989 [JP] Japan ................... 1-224853

[51] Int. Cl.⁵ ............... B29C 49/12; B29C 49/58; B29C 49/66
[52] U.S. Cl. .................. 264/528; 264/530; 264/531; 264/532; 425/526; 425/529; 425/535
[58] Field of Search ............ 264/528, 529, 530, 532, 264/520, 28, 531; 425/526, 530, 529, 535

[56] References Cited

U.S. PATENT DOCUMENTS

| | | |
|---|---|---|
| 3,233,416 | 2/1966 | Rainwater et al. .......... 264/528 |
| 3,488,801 | 1/1970 | Havely ...................... 264/520 |
| 4,039,641 | 8/1977 | Collins ..................... 264/528 |
| 4,152,383 | 5/1979 | Ryder ....................... 264/528 |
| 4,385,089 | 5/1983 | Bonnebat et al. ........... 264/529 |
| 4,871,507 | 10/1989 | Ajmera ..................... 264/528 |
| 4,883,631 | 11/1989 | Aimera ..................... 264/528 |

FOREIGN PATENT DOCUMENTS

| | | | |
|---|---|---|---|
| 2405809 | 6/1979 | France | ........... 264/528 |
| 54-77672 | 6/1979 | Japan . | |
| 59-93330 | 5/1984 | Japan . | |
| 62-33622 | 2/1987 | Japan . | |

*Primary Examiner*—Jan H. Silbaugh
*Assistant Examiner*—Catherine Timm
*Attorney, Agent, or Firm*—Oliff & Berridge

[57] ABSTRACT

A method for stretch blow molding a preform into a hollow container having a heat-resistant property, including the steps of heat setting the hollow container by maintaining the hollow container heated for a predetermined period of time within a blow mold and cooling the hollow container by the use of a cooling medium blown out from the forward end of a stretching rod at least during backward movement of the stretching rod. If the heat setting operation is to be performed in a heat setting mold separately of the blow mold, the hollow container is cooled by the cooling medium blown out from the forward end of a cooling medium introducing rod while being moved. Since the cooling medium outlet is axially moved, the hollow container can be cooled uniformly, even if the hollow container has a particularly increased rate of longitudinal stretch. If a cooling medium introducing tube for introducing the cooling medium along the central axis of the rod is thermally insulated, any sweating and/or freezing on the rod can be prevented.

8 Claims, 7 Drawing Sheets

METHOD FOR STRETCH BLOW MOLDING AND UNIFORMLY COOLING A HOLLOW HEAT-RESISTANT

BACKGROUND OF THE INVENTION

1. Field of the Invention

The present invention relates to an improved method and apparatus which can increase the heat-resistance in hollow biaxially-oriented containers formed by blow molding. More particularly, the present invention concerns improvements by which stretch blow molded containers can be efficiently cooled after they have been heat set and before they are removed out of the mold means.

2. Description of the Related Art

There is known a biaxial stretch blow molding process in which a preform placed within a blow cavity mold is engaged at its bottom by a stretching rod. As the stretching rod is moved in a direction of the longitudinal axis of the preform, the preform is stretched along the longitudinal axis thereof. A blow core inserted into the neck portion of the preform jets pressurized fluid to stretch the preform laterally or in a direction of the transverse axis of the preform.

Such a hollow container may be used as a beverage bottle which is required to have such a heat-resistant property as preventing the bottle from being thermally shrunken or deformed since the content thereof is heated and charged into the bottle. In order to form a hollow container having such a heat-resistant property, it is known that it is useful to heat-set a stretch blow molded container, that is, to maintain such a container heated for a predetermined period of time to adjust the orientation of the polymer thereof.

There have been proposed three methods of molding hollow heat-resistant containers:

(1) A blow mold is first heated up to 130° prior to stretch blow molding. After a container has been stretch blow molded, the temperature of the blow mold is cooled down to 100° to prevent the molded container from being deformed on removal, as disclosed in Japanese Laid-Open Patent Application 77672/1979.

(2) After stretch blow molded, a hollow container is retained within a heated blow mold to remove the residual stress at the stretched portion of the container while maintaining somewhat internal pressure in the hollow container. Thereafter, the hollow container is transferred into a separate cooled mold so that the hollow container is cooled and solidified. For example, see Japanese Laid-Open Patent Application 33622/1987.

(3) A blow mold is previously heated up to a predetermined temperature. After a hollow container has been stretch blow molded in such a heated blow mold, a gas (e.g. liquefied carbon dioxide) is blown into the interior of the hollow container through a stretching rod at room temperature to quench the hollow container before it is removed out of the blow mold. For example, see Japanese Laid-Open Patent Application 93330/1984.

The first and second mentioned processes according to the prior art are disadvantageous in that the cooling time is relatively prolonged to reduce the efficiency thereof, because they require to cool the blow mold having its large heat capacity down to a predetermined temperature or to transfer a hollow molded container into a separate cooling mold. On the contrary, the third process of the prior art is advantageous in that the cooling time and thus the efficiency can be improved since the hollow molded container is quenched directly by the cooling gas, that is, liquefied carbon dioxide while being held within the heated blow mold.

In the Laid-Open Patent Application 93330/1984 disclosing the third mentioned process, there is shown a stretching rod which has a hollow portion extending from the base to the middle part thereof. A pipe for introducing a cooling medium is coaxially disposed within this hollow portion of the stretching rod. The cooling medium outlet formed in the pipe at one end is positioned near the neck portion of the hollow container when the axially forward movement of the stretching rod is terminated.

When the cooling medium outlet of the pipe is disposed near the neck portion of the hollow container to introduce the cooling medium into the hollow container, the entire hollow container having a given length will not be efficiently cooled by the cooling medium. It may be difficult to cool the hollow container uniformly since various portions of the container are differently cooled by the cooling medium.

Since the cooling medium is introduced into the hollow container near the neck portion thereof, only the limited parts of the hollow container are cooled by the blown cooling medium. This also causes the reduction of the efficiency on cooling. Such a tendency is increased if a hollow container having an increased rate of longitudinal stretch is to be cooled by the cooling medium.

Although the third mentioned process of the prior art utilizes the cooling gas at room temperature, it is preferred that cooling medium is used at lower temperatures to reduce the cooling time and to improve the efficiency on molding.

SUMMARY OF THE INVENTION

It is therefore an object of the present invention to provide a method and apparatus for stretch blow molding a hollow heat-resistant container, which can blow the cooling medium against an increased area in the hollow container while introducing the cooling medium through a rod, for example, a stretching rod, resulting in uniform cooling throughout the hollow container.

Another object of the present invention is to provide a method and apparatus for stretch blow molding a hollow container, which can quench the hollow molded container without sweating and freezing in the stretching rod, even if a cooling medium having a lower temperature is used to cool the molded container.

In accordance with the first aspect of the present invention, the method comprises a step of holding the hollow container within a blow mold under a blow pressure and maintaining it heated for a predetermined period of time to heat set the molded container and a subsequent step of cooling the hollow container by a cooling medium blown from the forward end of a stretching rod at least during the backward movement of the stretching rod.

Since the cooling medium is blown from the stretching rod through the forward end thereof, the forward end of the stretching rod is necessarily positioned near the internal bottom portion of the hollow container after it has been biaxially oriented or stretched. When the stretching rod is axially and backwardly moved from such a position while blowing the cooling medium through the forward end thereof, the cooling medium can be blown against an increased area in the hollow container. Even if a hollow container having an increased rate of longitudinal stretch is to be cooled, it can be cooled more effectively as a whole.

The backward movement of the stretching rod is essential in the biaxial stretch blow molding process Therefore, the biaxial stretch blow molding system constructed according to the prior art necessarily comprises a mechanism for driving the stretching rod forwardly and backwardly. The present invention does not require to newly provide such a driving mechanism. On the other hand, the present invention may require somewhat prolonged time period to move the stretching rod backwardly. In accordance with the present invention, however, the cooling of the hollow container can be realized by utilizing part of the time period required to perform the aforementioned essential step. The present invention will not increase the cooling time and degrade the efficiency on molding.

In accordance with the second aspect of the present invention, the method comprises a step of biaxially stretch blow molding the hollow container in the blow mold, another step of setting the hollow molded container in a heated mold for heat setting the hollow container, and a subsequent step of, after heat set, moving the cooling medium introducing rod within the hollow container while causing the cooling medium to blow through the forward end of the rod to cool the hollow container.

In the second aspect of the present invention, the biaxial stretch blow molding of the hollow container is performed without the heat setting. The molded container is transferred into the heat setting mold separately of the blow mold. Before the hollow container is removed out of the heat setting mold, the hollow container can be cooled by the cooling medium blown from the forward end of the cooling medium introducing rod while moving it, as in the first aspect. Particularly, the cooling medium introducing rod can blow the cooling medium as it is moved either forwardly or backwardly. Therefore, the hollow container can be cooled uniformly.

If a cooling medium having a lower temperature, such as liquefied nitrogen, is used in the present invention, the cooling time can be more reduced. In such a case, the outlet of the stretching rod or cooling medium introducing rod may be subjected to sweating or freezing from moisture in atmosphere when the rod is cooled by the cooling medium blown through the outlet thereof. This may obstruct the forward or backward movement of the stretching rod or cooling medium introducing rod. In order to avoid such a problem, it is preferred to provide heat insulator means about the cooling medium introducing pipe extending along the central axis of the stretching rod or cooling medium introducing rod.

The present invention also provides an apparatus for carrying out the method mentioned above, comprising a stretching rod or cooling medium introducing rod having a construction of two concentrically disposed tubes, the inner tube serving as a cooling medium introducing tube which is being connected with the cooling medium outlet of the rod to blow out the cooling medium therethrough into the hollow container. Depending on different aspects of the present invention, the outer tube of the rod may be of the following different versions:

(1) The outer tube is a tube for conducting a thermal insulation fluid around the cooling medium introducing tube to the forward end of the rod at which the thermal insulation fluid is blown out.

(2) The outer tube is an exhausting tube connected to receive a fluid used to blow mold the hollow container and taken heat from the hollow molded container. The fluid is conducted around the cooling medium introducing tube to an outlet.

(3) The outer tube is an air-tight sealed insulating tube for maintaining vacuum around the outer wall of the cooling medium introducing tube.

In the first mentioned version, the thermal insulation can be realized by providing a step of introducing a thermal insulation fluid into the outer tube before or after the cooling step. In the second mentioned version, the blow molding fluid may be serve as a thermal insulation fluid by causing it to take heat from the hollow container and conducting the fluid around the cooling medium introducing tube before the cooling step. In the third mentioned version, the vacuum space around the cooling medium introducing tube may serve as a thermal insulation.

DETAILED DESCRIPTION OF THE PREFERRED EMBODIMENTS

First Embodiment

In general, the injection stretch blow molding system comprises preform injection molding means, temperature adjusting means, blow molding means and mold releasing means. However, the present invention will now be described in connection with its characterized blow molding means with respect to FIGS. 1 to 3.

Figure 2:
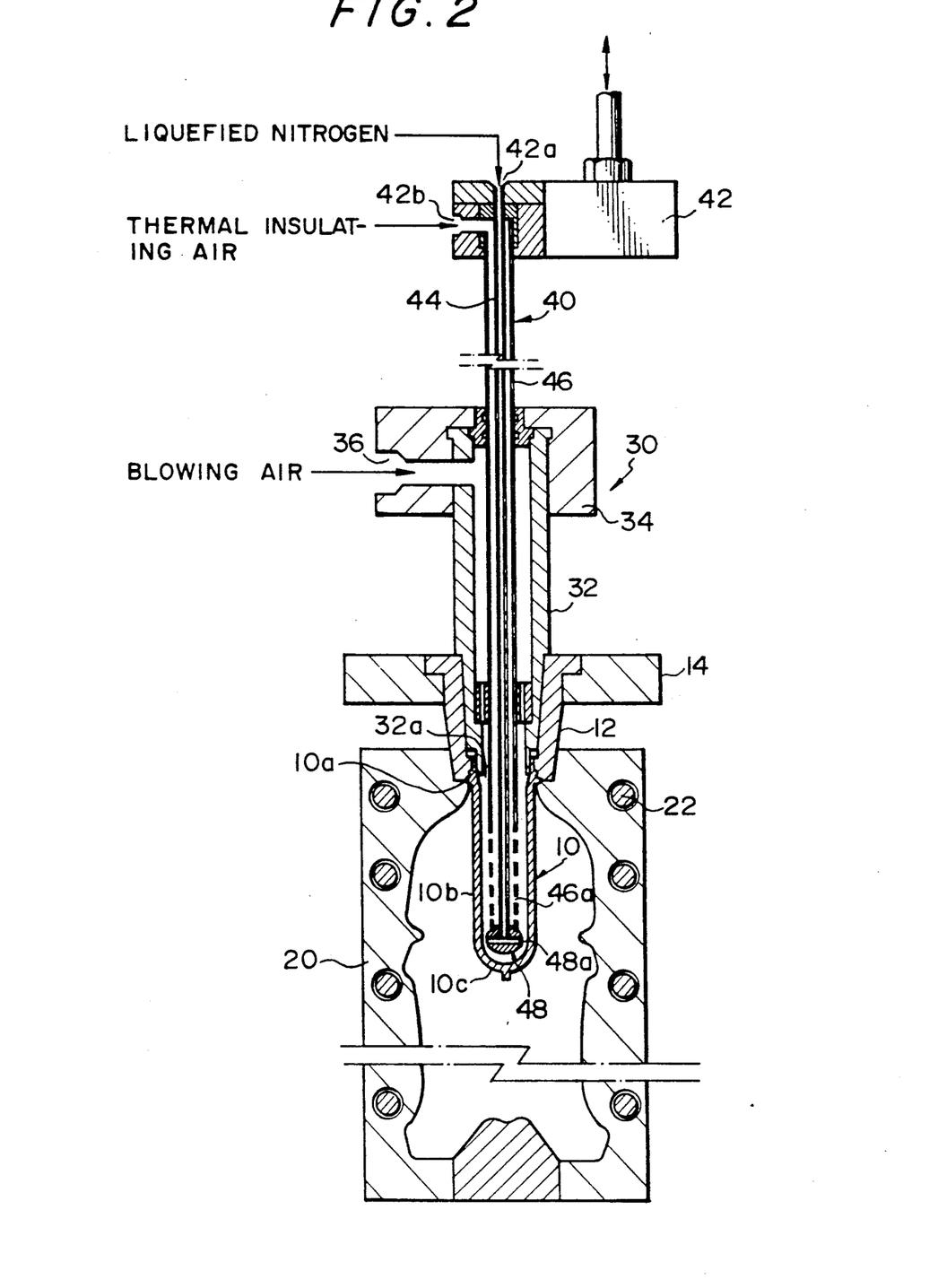
FIG. 2 is a cross-section of the details of another embodiment of a blow molding apparatus constructed according to the present invention.

Referring now to FIG. 2, there is shown a preform 10 including, for example, a neck portion 10a having an external threads formed therein, a body portion 10b extending downwardly from the neck portion 10a, and a bottom portion 10c sealingly formed on the lower end of the body portion 10b. The neck portion 10a of the preform 10 is supported by a neck mold 12 which is separatably supported on a neck mold fixing plate 14. The fixing plate 14 as well as the neck mold 12 are circulatingly moved through the aforementioned injection molding means, temperature adjusting means and blow molding means to complete one cycle in the molding process.

Figure 1:
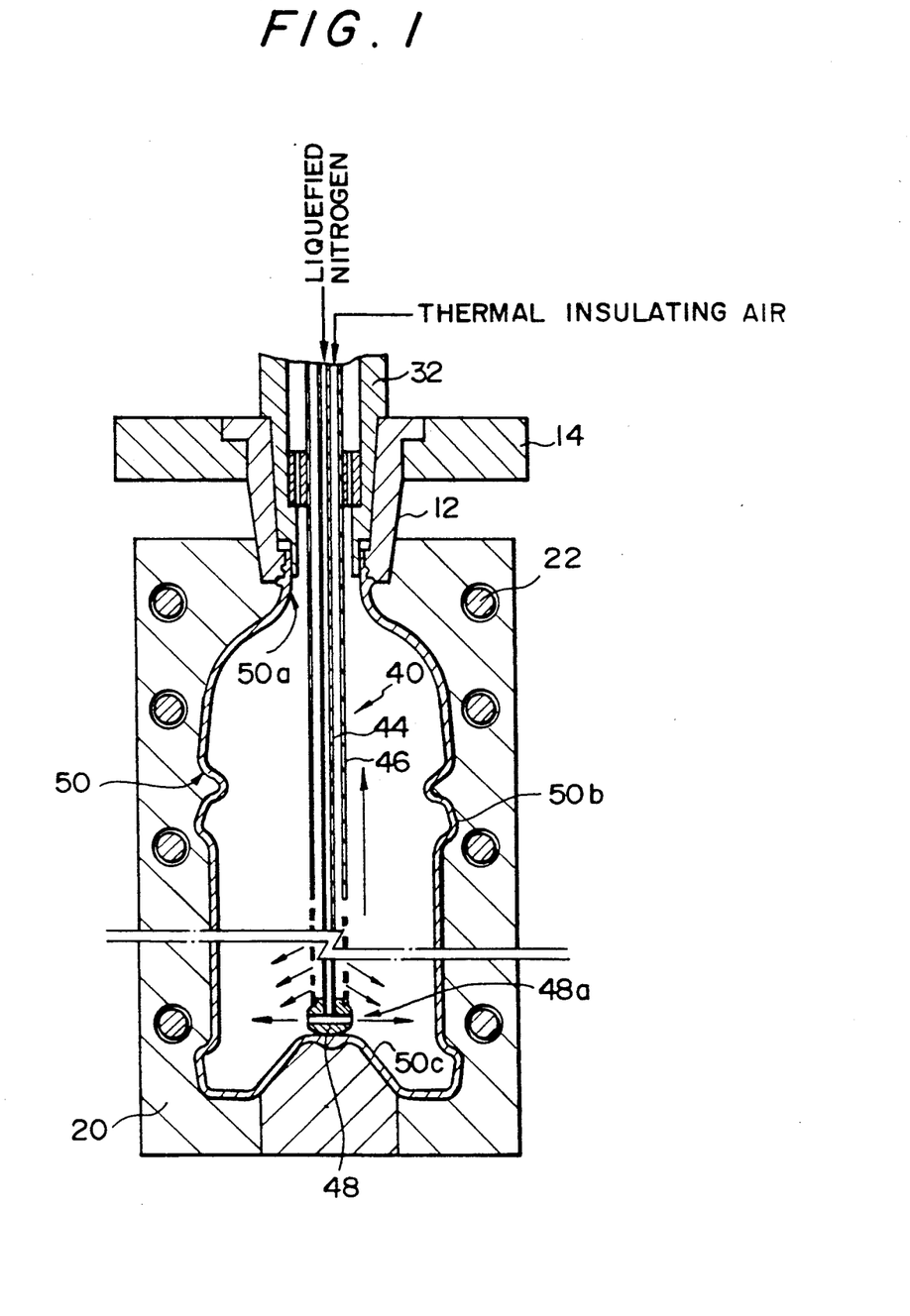
FIG. 1 is a schematic cross-section of one embodiment of a blow molding apparatus constructed according to the present invention, illustrating a cooling medium blown out while moving a stretching rod backwardly.

Blow mold 20 for blow molding includes two sections separatable from each other laterally as viewed in FIGS. 1 and 2. After the neck portion 12 holding the preform 10 is located in place, the blow mold sections are moved to their closed position at which a hollow container 50 can be formed in accordance with a biaxial stretch blow molding process. The blow mold 20 includes an internal heater 22 which is adapted to heat set the molded container 50 to provide a heat resistant property thereto.

A blow core unit 30 is disposed above the blow mold 20 and comprises a blow core 32 and a core fixing portion 34 for holding the blow core 32. The blow core 32 is of a hollow sleeve including a blowing air outlet 32a which is positioned within the neck portion 10a of the preform 10 on blow molding. The core fixing portion 34 includes a blowing air inlet 36 formed therein, which communicates with the hollow portion of the blow core 32. Exhaustion of air can be also performed through the blow core 32.

Figure 3:
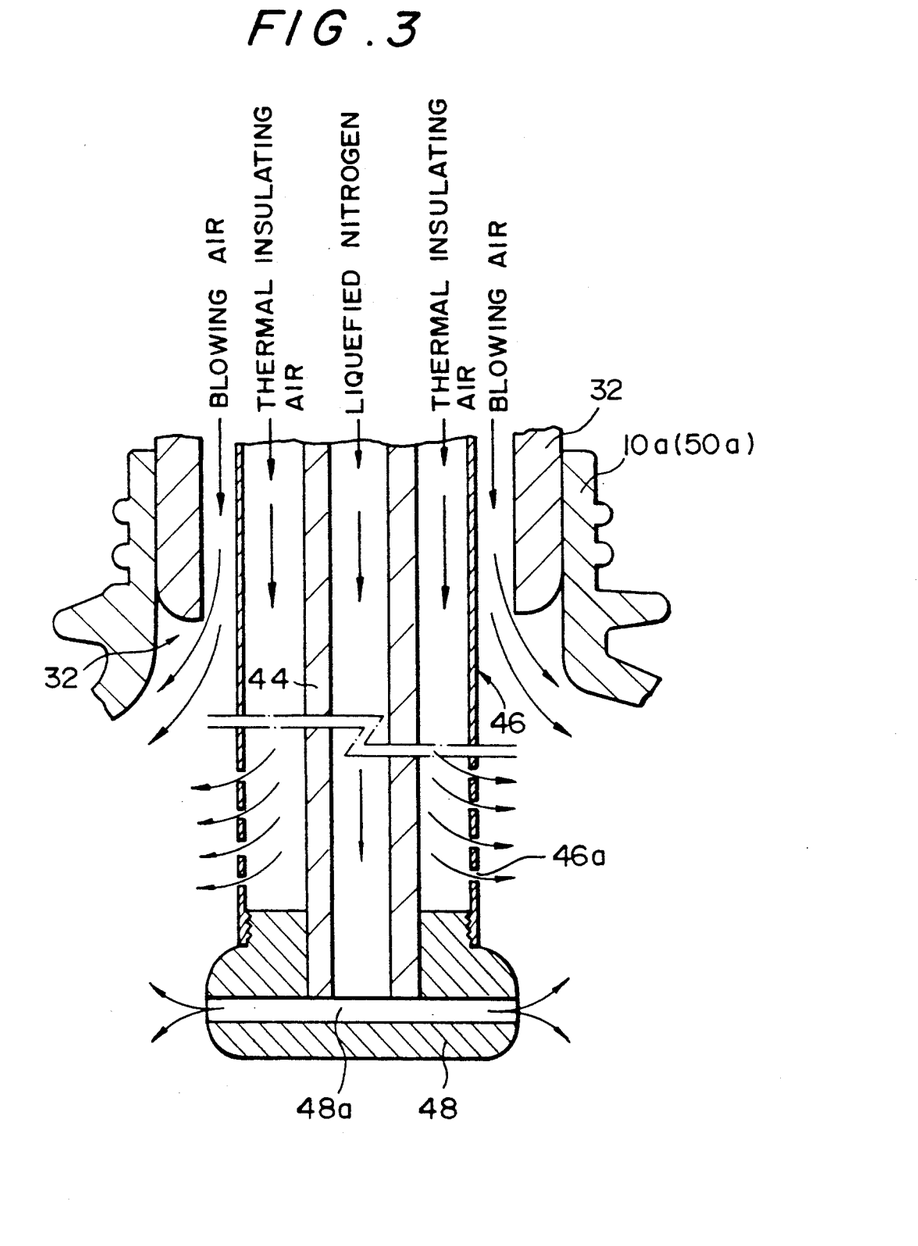
FIG. 3 is an enlarged cross-section of a double-tubed stretching rod used in the first and second embodiments of the present invention.

A stretching rod 40 for performing a longitudinal stretch against the preform 10 is fixedly supported, at its top end, on a rod fixing plate 42. The stretching rod 40 is of a construction consisting of two concentrically disposed tubes which extend from the top end to the bottom end of the rod. The inner tube in such a construction includes a cooling pipe 44 formed as a cooling medium introducing tube. The outer tube surrounding the inner tube is in the form of an insulating air pipe 46 serving as an thermal insulation fluid introducing tube. The top end of the cooling pipe 44 communicates with a cooling medium inlet port 42a formed in the rod fixing plate 42 to introduce the cooling medium such as liquefied nitrogen into the hollow container. The bottom end of the cooling pipe 44 is fitted into a tip piece 48 on the stretching rod, which is moved longitudinally within the bottom portion 10c of the preform 10. The tip piece 48 includes an outlet passage 48a formed therein in its diametrical direction, which communicates with the internal passageway of the cooling pipe 44.

On the other hand, the top end of the insulating air pipe 46 communicates with an inlet port 42b for receiving the insulating air, formed in the rod fixing plate 42. The bottom end of the pipe 46 includes a number of holes 46a formed therethrough. The insulating air can be blown out through these holes 46a.

The neck mold fixing plate 14, core fixing portion 34 and rod fixing plate 42 may be vertically moved as a unit. In addition, the core and rod fixing plates 34, 42 may be vertically moved independently of each other.

Figure 4:
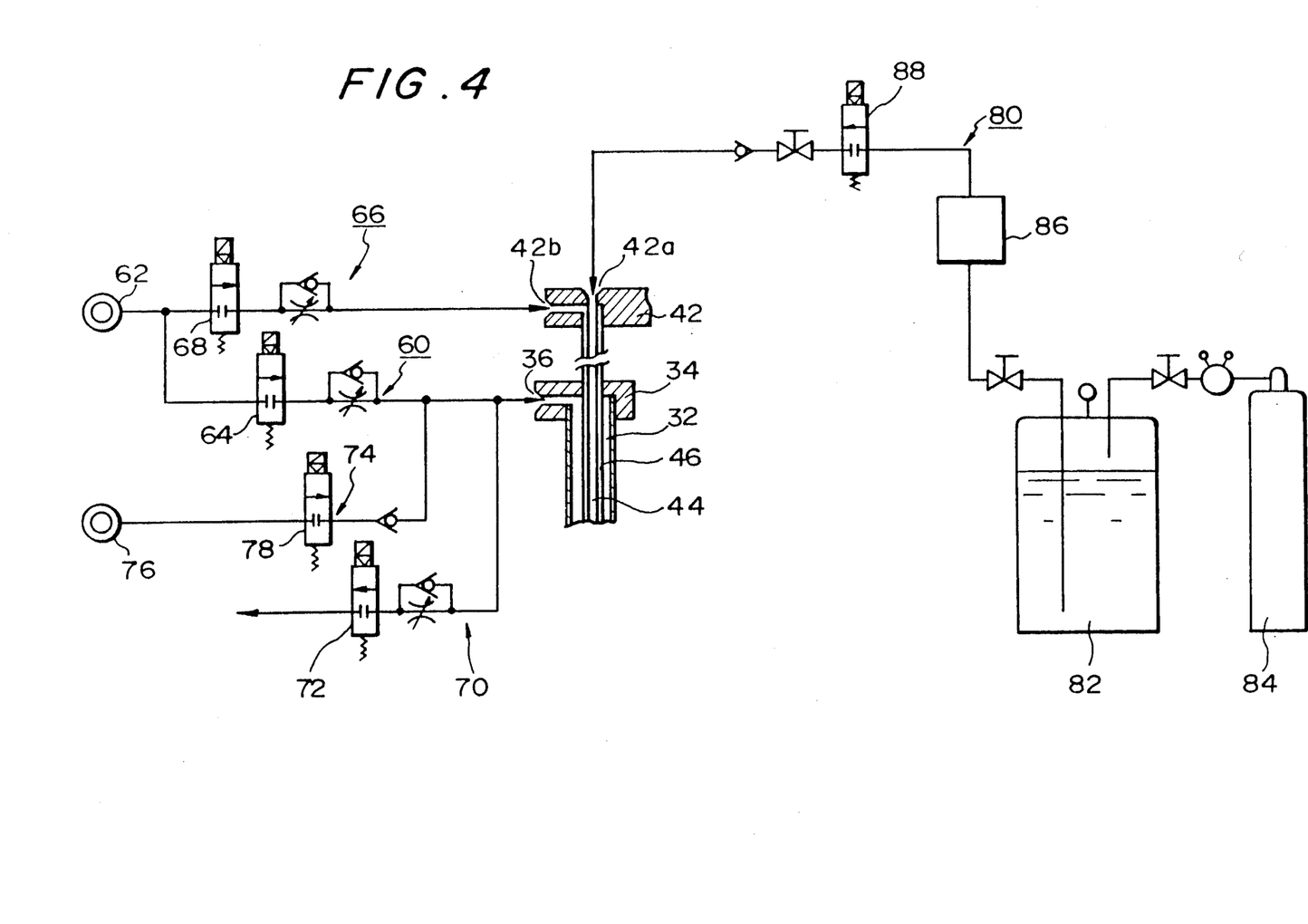
FIG. 4 is a schematic view illustrating a cooling medium supplying system, a blow molding air supplying system, a thermal insulation air supplying system and an exhausting system, all of which are used in the first embodiment of the present invention.

The systems for supplying and exhausting the blowing air, insulating air and cooling medium will now be described with reference to FIG. 4.

A primary air supply system 60 is connected with a first source of air 62, with the other end thereof being connected with the blowing air introducing inlet port 36 in the core fixing portion 34. An insulating air supply system 66 is connected with the source of air 62 common to the primary air supply system 60. The other end of the air supply system 66 is connected with the insulating air introducing inlet port 42b of the rod fixing plate 42.

An exhausting system 70 is connected with the middle of the primary air supply system 60, with the other end thereof being connected with a vacuum pump. Although the illustrated embodiment of the present invention utilizes a vacuum pump, natural exhaustion may be taken, if desired. First, second and third electromagnetically operated valves 64, 68 and 72 are respectively connected with the middle portions of the primary air, insulating air and exhausting systems 60, 64 and 70. A secondary air supply system 74 is connected with a second source of air 76, with the other end thereof being connected with the blowing air introducing inlet port 36 of the core fixing portion 34. The secondary air supply system 74 includes a fourth electromagnetically operated valve 78.

A cooling medium supply system 80 is provided to supply a cooling medium such as liquefied nitrogen and comprises a liquefied nitrogen bomb 82 which contains a body of liquefied nitrogen having a temperature of minus 198°. The bomb 82 is connected, at its top end, with another nitrogen bomb 84 which is adapted to feed gaseous nitrogen under pressure into the liquefied nitrogen bomb 82 such that the pressurized nitrogen gas will cause the liquefied nitrogen to discharge out of the bomb 82 under a predetermined pressure. If necessary, means for adjusting the temperature of the liquefied nitrogen 86 may be provided in the cooling medium supply system 80. Downstream of the temperature adjusting means 86, a fifth electromagnetically operated valve 88 is provided in the cooling medium supply system 80. The other end of the cooling medium supply system 80 is connected with the cooling medium introducing inlet port 42a of the rod fixing plate 42.

Blow molding process in the first embodiment mentioned above will now be described.

First Step

Drive mechanisms for moving the neck mold fixing plate 14, core fixing portion 34 and rod fixing plate 42 simultaneously and independently is energized while at the same time the blow mold 20 is closed. Thus, the preform 10 blow core 32 and stretching rod 40 are set as shown in FIG. 2. Therefore, the stretching rod 40 is downwardly moved to engage its tip piece 48 against the internal bottom 10c of the preform 10. On further movement of the rod 40, the Preform 10 is stretched along the longitudinally axis thereof. At the almost same time, the first electromagnetically operated valve 64 in the primary air supply system 60 is opened to supply blowing air to the interior of the preform 10 through the blowing air inlet 36, blow core 32 and blowing air outlet 32a. As a result, the longitudinally stretched preform is then stretched along the transverse axis. After the primary air having a pressure of 10 kg/cm$^2$ has been supplied, the system is changed to the secondary air supply system 74 to supply another blowing air having a pressure of 30 kg/cm$^2$ to the interior of the preform 10. As shown in FIG. 1, thus, the preform 10 will be blow molded and biaxially stretched into a hollow container 50 within the boundary defined by the cavity of the blow mold 20. During the biaxial stretch blow molding process, the heater 22 in the blow mold 20 is being energized. After molded, the hollow container 50 is held in intimate contact with the inner heated wall of the blow mold 20 for a predetermined period of time. As a result, the hollow container blow molded can be heat set to adjust the molecular orientation of the polymer material thereof. In such a manner, the hollow container 50 is provided as a heat-resistant container. Time required to perform the blow molding and heat setting steps may be in the order of about four seconds, for example.

Second Step

Next, the third valve 72 is opened to exchange the system to the exhausting system 70. The blowing air charged in the hollow container 50 will be exhausted outwardly through the exhausting system 70 via the blowing air outlet 32a, blow core 32 and blowing air inlet 36.

Third Step

In the third step, the second valve 68 is opened and the insulating air supply system is energized. Insulating air will be fed from the insulating air supply system 66 into the interior of the hollow container 50 through the insulating air inlet 42b and insulating air pipe 46 via the holes 46a in the insulating air pipe 46. As the insulating air passes through the insulating air pipe 46, a thermally insulating function can be provided for the cooling pipe 44. Time required to make the second and third steps may be about five seconds, for example.

Fourth Step

In this fourth step and the fifth step described later, the hollow container 50 will be cooled. For this purpose, the cooling medium supply system 80 is activated to feed nitrogen gas from the nitrogen gas bomb 84 into the liquefied nitrogen bomb 82 through the top end inlet thereof. By suitably selecting the pressure of the gaseous nitrogen, a given amount of liquefied nitrogen can be supplied through the temperature adjusting section 86 and the fifth valve 88. The liquefied nitrogen is moved into the interior of the stretching rod 40 through the cooling medium inlet 42 and cooling pipe 44 and then discharged into the interior of the hollow container 50 through the outlet port 48a in the tip of the stretching rod 40. At this time, the tip end of the stretching rod 40 is positioned near the bottom 50c of the hollow container 50, as shown in FIG. 1. Therefore the portion of the hollow container 50 near its bottom 50c can be more effectively cooled by the cooling medium. The cooling operation when the stretching rod 40 is held stationary requires at most about one second, for example.

Fifth Step

In the fifth step, the cooling operation similar to that of the fourth step is repeated while moving the stretching rod 40 backwardly or upwardly. Since the outlet port 48a for liquefied nitrogen is moved longitudinally within the hollow container 50, substantially the entire length of the hollow container 50 can be cooled uniformly. It is preferred that the stretching rod 40 is moved and stopped near the neck portion 50a of the hollow container 50. As shown in FIG. 2, however, the stretching rod 40 may be moved and stopped at the initial position before the blow molding step is started. The cooling step in the fifth step requires about three seconds, for example.

Sixth Step

After termination of the aforementioned cooling steps, the insulating air supply system 66 is again activated to feed the insulating air into the insulating air pipe 46 which is the outer tube in the stretching rod 40. This prevents sweating and/or freezing from being created on the outer wall of the stretching rod 40. Time required to perform the sixth step is sufficient to be about one second.

During the operation through the third to sixth steps, the exhaustion must be continued while adjusting the pressure depending on the molding process. Only when the exhaustion is terminated on the end of the sixth step, the finished hollow container 50 can be removed out of the mold.

Second Embodiment

Figure 5:
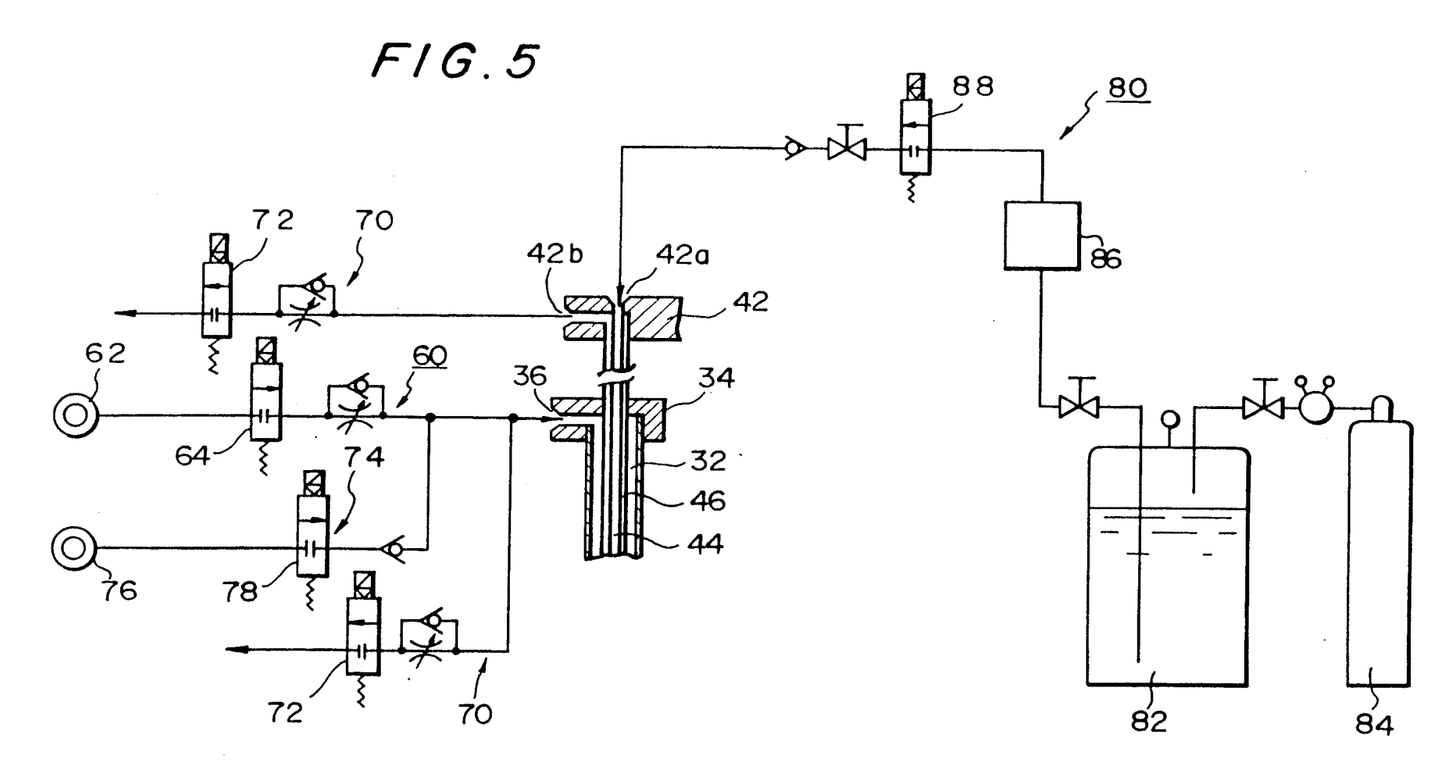
FIG. 5 is a schematic view illustrating various similar systems used in the second embodiment of the present invention.

The construction of the second embodiment is substantially similar to that of the blow molding apparatus shown in FIGS. 1 to 3, except that as shown in FIG. 5, the insulating air supply system 66 is omitted and the exhausting system 70 is connected with the insulating air outlet port 42b of the rod fixing plate 42, which corresponds to the insulating air inlet port in the first embodiment). Thus, the insulating air pipe 46 will function to exhaust the air used to form the hollow container 50 and taken heat from the same.

In the first step, the biaxial stretch blow molding process is performed as in the first embodiment. In the second step, the exhausting system 70 connected with the insulating air pipe 46 is activated to exhaust the blowing air from the hollow container 50 through the holes 46a therein. This allows the thermal insulation as in the third step of the first embodiment to cancel. Thereafter, the hollow container 50 may be cooled as in the fourth and fifth steps of the first embodiment. In the sixth step, the liquefied nitrogen may be discharged through the exhausting system 70 connected with the blow core 32. This is adapted in the second embodiment because the stretching rod 40 may be probably frozen by the liquefied nitrogen exhausted through the insulating air pipe 46 and having a temperature substantially lower than that of the blowing air.

In the second embodiment, thus, the air supplied to the interior of the hollow container 50 and taken heat from the same is exhausted through the insulating air pipe 46 in order to thermally insulate the stretching rod 40 before it receives the cooling medium. Therefore, the cooling pipe 44 inside of the pipe 46 can be subjected to thermal insulation such that any sweating and/or freezing on the stretching rod 40 can be prevented as in the first embodiment.

Third Embodiment

Figure 6:
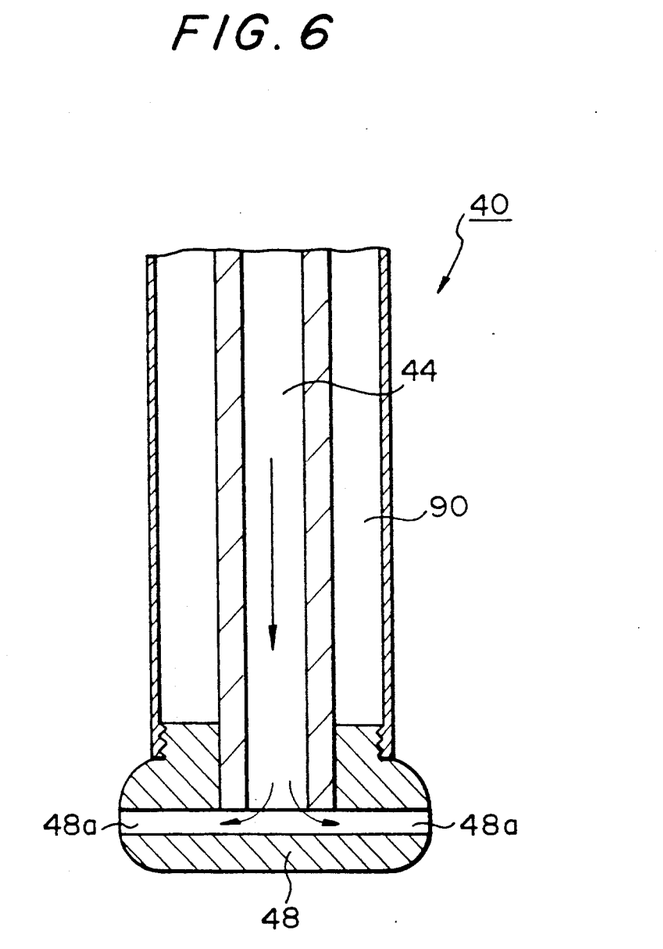
FIG. 6 is a schematic cross-section of a double-tubed stretching rod in the third embodiment of the present invention.

The third embodiment is shown by the cross-section of the stretching rod 40 in FIG. 6. This stretching rod 40 is of a double-tubed construction including the same inner cooling pipe 44 as in the first and second embodiments, but a different outer tube which is in the form of an air tight tube 90 sealed at its top and bottom ends. The interior of the tube 90 has been previously evacuated into vacuum. The vacuum tube 90 serves as a thermal insulation body for the stretching rod 40. Therefore, the third embodiment does not require to include any insulating air pipe 46 and also to perform the exhaustion through such a pipe 46. Consequently, the third embodiment does not require the third through sixth steps as in the first embodiment. Furthermore, the third embodiment can cancel such an insulating air supply system 66 as in the construction shown in FIG. 4.

Although the construction of the third embodiment may be slightly complicated in comparison with that of the previously described stretching rod 40 since the air tight tube 90 should be evacuated into vacuum, the vacuum insulating layer can be always positioned about the cooling pipe 44 without additional insulation time and with reduction of time required to perform the molding cycle.

Fourth Embodiment

Figure 7:
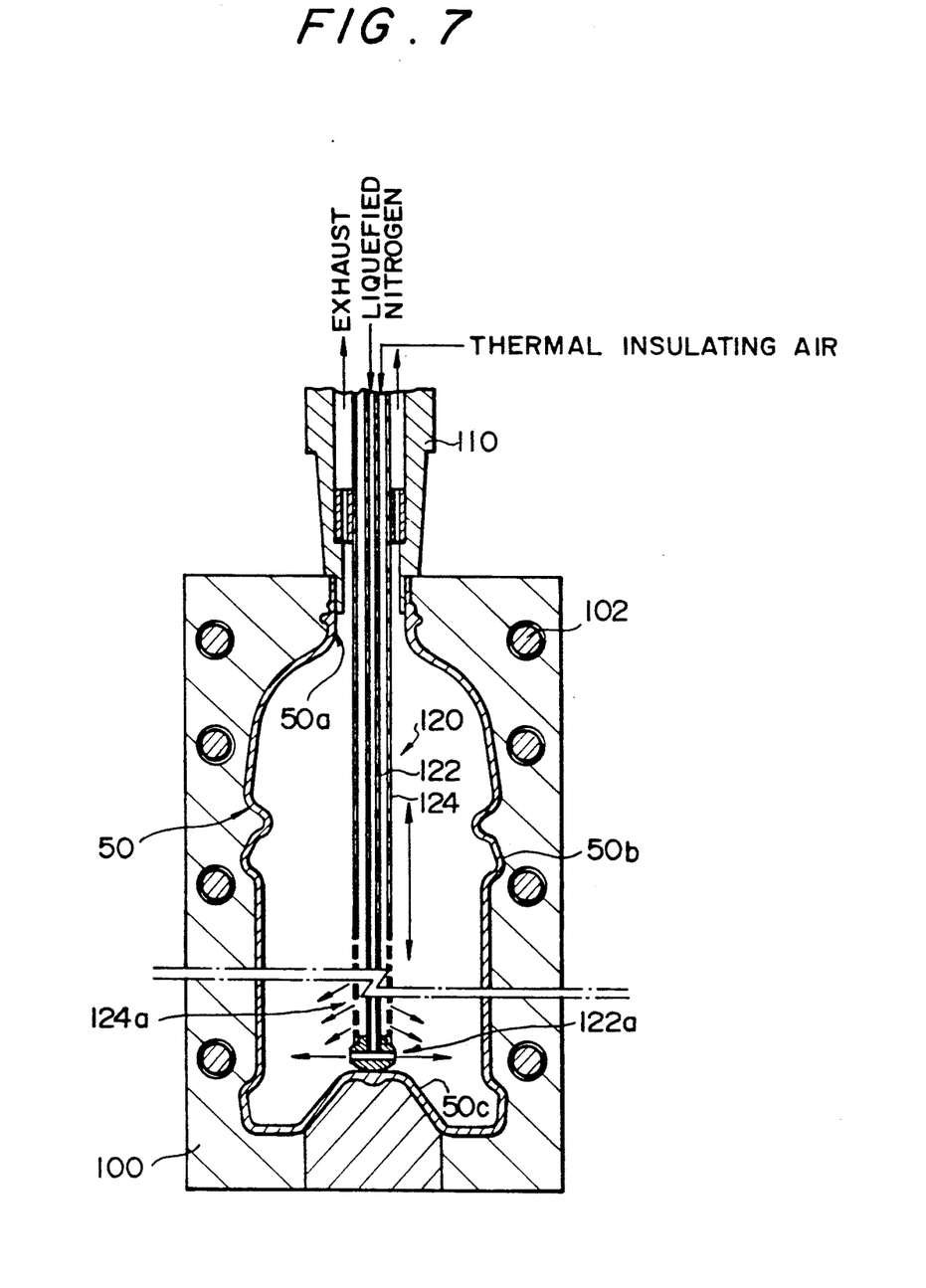
FIG. 7 is a schematic cross-section of a heat setting mold and cooling medium introducing rod which are used in the fourth embodiment of the present invention.

As shown in FIG. 7, the fourth embodiment utilizes a heat setting mold 100 separated from the blow mold 20, which is used to heat set and cool the hollow container 50.

In the fourth embodiment, therefore, the blow mold 20 does not require any heater contained therein. Instead, the heat setting mold 100 includes a heater 102 contained therein. The stretching rod may include merely its tip piece 48, but is not required to be in the form of a double-tubed construction. After the follow container 50 has been molded in the blow mold 20, it is transferred into and set in the heat setting mold 100 wherein the hollow container 50 will be heat set and cooled.

The neck portion 50a of the hollow container 50 set in the heat setting mold 100 receives an exhausting core 110 through which a cooling medium introducing rod 120 is moved vertically along the central axis of the exhausting core 110. The cooling medium introducing rod 120 is of a double-tubed construction as in the stretching rod 40 of the first embodiment. The double-tubed construction includes a cooling pipe 122 having an outlet port formed therein at the tip end and an insulating air pipe 124 having holes 124a formed therein.

In the fourth embodiment, the heat setting is carried out after the hollow container 50 has been transferred from the blow mold 20 to the heat setting mold 100. Thus, the molding cycle is naturally extended. Therefore, the hollow container 50 can be cooled by cooling medium such as liquefied nitrogen blown out of the tip end of the cooling medium introducing rod 120 when it is being moved downwardly or upwardly after the heat setting has been terminated. This allows the same uniform and effective cooling operation as in the first embodiment. Furthermore, the rod 120 can be prevented from being frozen by introducing the insulating air through the insulating air pipe 124. Such a thermal insulation may be attained also by using the air tight tube 90 shown in FIG. 6. In the fourth embodiment, further, the exhausting core 110 may be used also as means for introducing a third air into the interior of the hollow container 50 set in the heat setting mold 100. This version may be applied to the second embodiment wherein the blowing air is exhausted through the insulating air pipe 124.

It will be apparent for a person skilled in the art that the present invention is not limited to various embodiments shown and described herein and that many modifications and changes thereof may be make within the spirit and scope of the invention. For example, fluids used for blowing, thermally insulating and cooling may be selected from various kinds of fluid other than the fluids used in the illustrated embodiments. Depending on the kind of cooling medium used, the temperature adjusting section 86 as shown in FIGS. 4 and 5 may be omitted, for example, when a cooling medium used does not have a temperature as low as that of the liquefied nitrogen or when the piping has a resistance to low temperature. Timing required to supply the blowing air, cooling medium or thermal insulation air may be changed optionally. Moreover, any thermal insulation material having its low heat transfer coefficient may be used to surround the cooling medium introducing tube, without provision of the thermal insulator means illustrated in connection with the embodiments of the present invention.

We claim:

1. A method for stretch blow molding a preform into a hollow container having a heat-resistant property, comprising the steps of:

positioning the preform in place within a heated blow mold;

biaxially stretching and blow molding said preform into said hollow container by longitudinally stretching said preform under the action of a stretching rod moved forwardly while causing a forward end of said stretching rod to engage the internal bottom of said preform and by transversely stretching said preform under the action of blowing fluid blown out from a blow core located within the neck portion of said preform;

holding said hollow container within said blow mold under a blowing pressure and heat setting said hollow container by maintaining said hollow container heated for a predetermined period of time;

cooling said hollow container, which has been heat set, by a cooling medium blown out from the forward end of said stretching rod at least during backward movement of said stretching rod away from the internal bottom of said reform;, and thereafter removing said hollow container from said blow mold.

2. A method as defined in claim 1 wherein said cooling step is carried out by the cooling medium introduced into the interior of said hollow container while thermally insulating a cooling medium introducing tube formed along the central axis of said stretching rod.

3. A method as defined in claim 1 wherein said stretching rod is of a double-tubed construction including an inner cooling medium introducing tube and an outer insulating fluid introducing tube and wherein a thermal insulation fluid is introduced into the outer tube before or after the cooling medium is introduced into the inner tube.

4. A method as defined in claim 1 wherein said stretching rod is of a double-tubed construction including an inner cooing medium introducing tube and an outer insulating fluid exhausting tube and wherein the blow molding fluid blown out into the interior of the hollow container and which has taken heat from the hollow container is exhausted through the outer tube before the cooling medium is introduced into the inner tube.

5. A method for stretch blow molding a preform into a hollow container having a heat-resistant property, comprising the steps of:

positioning the preform in place within a blow mold;

biaxially stretching and blow molding said preform into said hollow container by longitudinally stretching said preform under the action of a stretching rod moved forwardly while causing a forward end of said stretching rod to engage the internal bottom of said preform and by transversely stretching said preform under the action of blowing fluid blown out from a blow core located within the neck portion of said preform.

transferring the hollow container from said blow mold into a heated heat setting mold after the hollow container has been subjected to the biaxially stretching and blow molding step in said blow mold and then maintaining the hollow container heated for a predetermined period of time to heat set the hollow container;

then cooling the hollow container by a cooling medium blown out from the forward end of a cooling medium introducing rod put into said hollow container through the neck portion of said hollow container while moving said cooling medium introducing rod in the longitudinal axial direction within the interior of the hollow container; and thereafter removing the hollow container out of said blow mold.

6. A method as defined in claim 5 wherein said cooling step is performed by introducing the cooling medium into a cooling medium introducing tube formed along the central axis of said cooling medium introducing rod while thermally insulating the outer periphery of said cooling medium introducing tube.

7. A method a defined in claim 5 wherein said cooling medium introducing rod is of a double-tubed construction including an inner cooling medium introducing tube and an outer insulating fluid introducing tube and wherein a thermal insulation fluid is introduced into the outer tube before or after the cooling medium is introduced into the inner tube.

8. A method as defined in claim 5 wherein said cooling medium introducing rod is of a double-tubed construction including an inner cooling medium introducing tube and an outer insulation fluid exhausting tube and said method comprising, prior to the introduction of cooling medium into said inner tube, the steps of introducing pressurizing fluid into the interior of the hollow container during said heat setting step and then exhausting the pressurizing fluid through the outer tube after the fluid has taken heat from the hollow container.

* * * * *

UNITED STATES PATENT AND TRADEMARK OFFICE
CERTIFICATE OF CORRECTION

PATENT NO.  : 5,085,822
DATED       : February 4, 1992
INVENTOR(S) : Shinichi UEHARA; Kouichi SATOU; Seigo BABA It is certified that error appears in the above-identified patent and that said Letters Patent is hereby corrected as shown below:

On the cover page, in section [54], after "HEAT-RESISTANT" insert --CONTAINER--.

Column 1, in the title, after "HEAT-RESISTANT" insert --CONTAINER--.

Signed and Sealed this

Twenty-seventh Day of April, 1993

*Attest:*

MICHAEL K. KIRK

*Attesting Officer*     *Acting Commissioner of Patents and Trademarks*